United States Patent Office 3,388,964
Patented June 18, 1968

3,388,964
SHRINKPROOFING WOOL WITH DIISOCYANATES AND ETHYLENIMINE
Nathan H. Koenig, Berkeley, Calif., assignor to the United States of America as represented by the Secretary of Agriculture
No Drawing. Filed Aug. 19, 1965, Ser. No. 481,145
3 Claims. (Cl. 8—127.6)

A non-exclusive, irrevocable, royalty-free license in the invention herein described, throughout the world for all purposes of the United States Government, with the power to grant sublicenses for such purposes, is hereby granted to the Government of the United States of America.

The invention concerns and has as its prime object the provision of novel processes for shrinkproofing wool. Further objects of the invention will be apparent from the following description wherein parts and percentages are by weight unless otherwise specified.

Although wool is a very useful fiber it is often desirable to improve its properties for particular applications by chemically modifying it. Various compounds have been proposed for reaction with wool to produce modified fibers. It is known, for example, that wool can be chemically modified by reacting it with mono- and di-isocyanates.

It is well known that laundering causes severe shrinkage of woolen textiles. This technical disadvantage seriously restricts the applications of wool in textile products, and much research has been undertaken to modify the natural fiber to reduce its shrinkage properties.

In accordance with the invention, wool is rendered shrink-proof by reacting it with a mixture of a diisocyanate and ethylenimine. It has been found that such reaction yields superior results as compared with the reaction of wool with either the diisocyanate or ethylenimine applied per se. A primary advantage of the process of the invention is that the degree of shrinkproofing imparted to the wool is greater than when the reactants (diisocyanate and ethylenimine) are applied individually. Another advantage of the invention is that when both diisocyanate and ethylenimine are applied, they react not only with the wool but with one another with the net result that the uptake of reactants by the wool—that is, the degree of modification—is higher than when either of the reactants are applied separately under the same conditions. Expressed in other words, the process of the invention achieves a degree of modification which is far greater than the expected additive effect, i.e., by employing a mixture containing both a diisocyanate and ethylenimine, I obtain a synergistic effect. The unusual results obtained with conjoint use of a diisocyanate and ethylenimine are demonstrated in the examples set forth hereinbelow. Another advantage of the process of the invention is that the improvement is essentially permanent; the treated materials do not lose their new properties after long use or cleaning but retain these properties for the life of the material.

The reaction is preferably carried out in the presence of dichloromethane as a volatile diluent to distribute the diisocyanate and ethylenimine uniformly over the wool. Other inert low-boiling solvents can be used, for example, petroleum ether, acetone, methyl acetate, etc. In a practice of the invention, heat is applied to evaporate the diluent and cause the residual diisocyanate and ethylenimine to react with the wool.

Carrying out the process of the invention essentially involves contacting wool with a mixture of the diisocyanate, ethylenimine, and diluent. The reaction conditions such as proportion of reagents, specific diisocyanate used, time, temperature, etc. are not critical and may be varied to suit individual circumstances without changing the basic nature of the invention. The proportions of active ingredients—i.e., diisocyanate and ethylenimine—are generally selected in the range from 5 to 95% of diisocyanate and the remainder (95 to 5%) of ethylenimine. The amount of diluent is not critical, since it is inert and is essentially all evaporated prior to the time that the diisocyanate and ethylenimine react with the wool.

The process of the invention can also be carried out by serially applying to the wool the diisocyanate followed by the ethylenimine. Such serial application may be used to avoid reaction of diisocyanate with ethylenimine in a stored mixture prior to contact of the mixture and wool. As an example of serial application, the wool may be impregnated with a solution of diisocyanate in dichloromethane and passed through squeeze rolls to remove excess liquid. The wool is then impregnated with ethylenimine in dichloromethane and heated to evaporate the dichloromethane and effect the conjoint reaction of the residual diisocyanate and ethylenimine with the wool.

The temperature of reaction may be from 50 to 125° C. The reaction rate is increased with increasing temperature and a preferred range to expedite the reaction, yet without damage to the wool, is 100–115° C. The time of reaction will vary depending on such factors as the amount of diluent, temperature of reaction, reactivity of the diisocyanate selected, and the degree of modification desired. In general, the reaction may take anywhere from several minutes to several hours. Ordinarily, the reaction is applied to wool in its normal, undried condition (containing about 13% $H_2O$). However, the wool may be dried before contacting it with the reactants.

The degree of modification of the wool is influenced by the proportion of modifying agents taken up by the fiber; that is, the higher the uptake of diisocyanate and ethylenimine the greater will be the degree of modification of the wool. In general, the uptake of diisocyanate and ethylenimine may be varied from 1 to 50%. In most cases it is desirable to adjust conditions to obtain the lowest uptake consistent with the desired degree of shrink-resistance; since the softness of hand of the treated fabric is generally closer to that of wool, and more desirable, the lower the uptake. Taking these factors into account, it is generally preferred to limit the uptake of the modifying agents to about 1–10%.

After reaction of the wool with the mixture of diisocyanate and ethylenimine, the treated wool is processed to remove excess reagents. Thus, the wool may be processed by wringing, passage through squeeze rolls, centrifugation, or the like. In place of such mechanical action, or in addition thereto, the treated wool product may be extracted with a solvent such as trichloroethylene, benzene, acetone, butanone, ethanol, carbontetrachloride, etc. Successive extractions with different solvents may be applied to ensure complete removal of all unreacted materials. The treated wool is then dried in the usual way.

Although the properties of the treated wool indicate that actual chemical combination of the wool with the diisocyanate and ethylenimine has taken place, it is not known for certain how these chemicals are united with the wool. It is believed, however, that the diisocyanate and ethylenimine react with some of the sites on the wool molecule where there are reactive hydrogen atoms, e.g., amino, guanidino, and thiol groups. Moreover, it is believed that the diisocyanate and ethylenimine also react with each other and with moisture in the wool. It may be, however, that other reactions occur and I do not intend to limit the invention to any theoretical basis.

It is to be noted that the reaction in accordance with the invention does not impair the wool fiber for its intended purpose, that is, for producing woven or knitted textiles, garments, etc. The process of the invention may be applied to wool in the form of fibers, as such, or in the form of threads, yarns, slivers, rovings, knitted or woven goods, felts, etc. The wool textiles may be white or dyed goods and may be of all-wool composition or blends of wool with other textile fibers such as cotton, regenerated cellulose, viscose, animal hair, etc.

Typical examples of diisocyanates which may be used in accordance with this invention are listed below by way of illustration but not limitation:

As the diisocyanate one may employ any of the aliphatic, aromatic, or aromatic-aliphatic compounds containing two isocyanate (—NCO) groups, preferably separated by at least two carbon atoms. The diisocyanates may be substituted if desired with non-interfering (non-functional) substituents such as ether groups, thioether groups, sulphone groups, halogen atoms, etc. Typical examples of compounds in this category are listed below merely by way of illustration and not limitation: Ethylene diisocyanate, propylene diisocyanate, butylene diisocyanate, trimethylene diisocyanate, tetramethylene diisocyanate, hexamethylene diisocyanate, octamethylene diisocyanate, decamethylene diisocyanate, cyclohexylene diisocyanate, bis (2-isocyanatoethyl) ether, bis(2-isocyanatoethyl) ether of ethylene glycol, o-phenylene diisocyanate, m-phenylene diisocyanate, p-phenylene diisocyanate, tolylene-2,4-diisocyanate, tolylene-2,6-diisocyanate, 3,3'-bitolylene-4,4'-diisocyanate, diphenyl ether-4,4'-diisocyanate, diphenylmethane - 4,4'-diisocyanate, 3,3'-dimethoxy-biphenylene-4,4'-diisocyanate, naphthalene diisocyanates, polymethyl polyphenyl isocyanates, etc.

EXAMPLES

The invention is further demonstrated by the following illustrative examples.

The wool used in the experiments set forth below was scoured, undyed wool flannel, 7 oz. per sq. yd. Prior to treatment, the wool was exhaustively extracted with ether, followed by ethanol, then conditioned at 65% relative humidity and 21° C. (standard conditions). The fabric was cut into circular samples for the treatments. In the treatments, the dry weight of wool was calculated by a moisture factor or the sample was dried prior to weighing. All weight increases are given on a dry wool basis.

The shrinkage tests were conducted as follows: Measured fabric samples, including an untreated wool control, were violently agitated in an "Accelerotor" at 1700 r.p.m. for 6 minutes at 40–42° C. with 0.9% aqueous sodium oleate solution, using a liquor-to-wool ratio of 50 to 1. After this washing operation, the samples were re-measured to determine area shrinkage.

Example I (A) REACTION OF WOOL WITH DIISOCYANATE AND ETHYLENIMINE

Wool fabric (1.4 g.), tolylene-2,4-diisocyanate (0.3 ml.), ethylenimine (0.1 ml.), and dichloromethane (5 ml.) were put in a covered (but unsealed) Petri dish and held in an oven at 105° C. for 30 minutes. The treated wool was successively extracted with warm acetone and hot ethanol to remove unreacted reagents, then dried. The increase in weight of the wool, due to its combination with the diisocyanate and ethylenimine, was 33%.

(B) APPLICATION OF DIISOCYANATE, ALONE

Wool fabric (1.4 g.), tolylene-2,4-diisocyanate (0.3 ml.) and dichloromethane (5 ml.) were put in a covered (but unsealed) Petri dish and held in an oven at 105° C. for 30 minutes. The treated wool was extracted as described in Part A, and dried. It was found that the increase in the weight of the wool was 3%.

(C) APPLICATION OF ETHYLENIMINE, ALONE

Wool fabric (1.4 g.), ethylenimine (0.1 ml.), and dichloromethane (5 ml.) were put in a covered (but unsealed) Petri dish and held in an oven at 105° C. for 30 minutes. The treated wool was extracted as described in Part A, and dried. The increase in the weight of the wool was 5%.

The samples were also subjected to shrinkage tests. The results are summarized below:

| | Reactants used | | Increase in weight of wool, percent | Area shrinkage, percent |
|---|---|---|---|---|
| | Diisocyanate | Ethylenimine | | |
| Run: | | | | |
| A | Yes | Yes | 33 | 0 |
| B | Yes | No | 3 | 40 |
| C | No | Yes | 5 | 37 |

The synergistic effect of conjoint treatment with diisocyanate and ethylenimine can also be demonstrated at much lower uptakes, as in the subsequent examples, by means of the shrink resistance conferred on the wool by the combination treatment.

Example II

Wool fabric (1.4 g.), tolylene-2,4-diisocyanate (0.02 ml.), ethylenimine (0.04 ml.), and dichloromethane (5 ml.) were put in a covered, unsealed Petri dish and held in an oven at 105° C. for 45 minutes. The treated wool was extracted as described in Example I, and dried. The increase in the weight of the wool was 5%. In the "Accelerotor" test, the area shrinkage of this sample was 0%, compared to 51% for the untreated wool.

Example III

Wool fabric (1.4 g.), tolylene-2,4-diisocyanate (0.04 ml.), ethylenimine (0.02 ml.), and dichloromethane (5 ml.) were put in a covered, unsealed Petri dish and held in an oven at 105° C. for 45 minutes. The treated wool was extracted as described in Example I, and dried. The increase in the weight of the wool was 6%, and the area shrinkage in the "Accelerotor" test was 0%, compared to 51% for the untreated wool.

Example IV

Wool fabric (1.4 g.), hexamethylene diisocyanate (0.1 ml.), ethylenimine (0.1 ml.), and dichloromethane (5 ml.) were put in a covered, unsealed Petri dish and held in an oven at 105° C. for 90 minutes. The treated wool was extracted as described in Example I, and dried. The increase in the weight of the wool was 12%, and the area shrinkage in the "Accelerotor" test was 0%, compared to 51% for the untreated wool.

Having thus described the invention, what is claimed is:

1. A process for shrinkproofing wool which comprises reacting the wool with a mixture containing 5 to 95% by weight of ethylenimine and 95 to 5% by weight of an organic diisocyanate selected from the group consisting of aliphatic, aromatic, and aromatic-aliphatic diisocyanates.

2. The process of claim 1 wherein the diisocyanate is tolylene-2,4-diisocyanate.

3. The process of claim 1 wherein the diisocyanate is hexamethylene diisocyanate.

References Cited

UNITED STATES PATENTS

| | | | |
|---|---|---|---|
| 2,131,145 | 9/1938 | Schlack | 8—127.6 X |
| 2,317,965 | 4/1943 | Bestian | 8—128 X |
| 2,880,054 | 3/1959 | Moore | 8—127.6 |
| 2,925,317 | 2/1960 | Moore et al. | 8—127.6 |
| 3,279,882 | 10/1966 | Tesoro | 8—127.6 |

NORMAN G. TORCHIN, *Primary Examiner.*

J. CANNON, *Assistant Examiner.*